United States Patent
Niemelä et al.

(10) Patent No.: US 6,739,446 B2
(45) Date of Patent: May 25, 2004

(54) METHOD FOR MEASURING THE SURFACE HEIGHT OF A MATERIAL BED CONDUCTED ON A CONVEYOR BELT TO THERMAL TREATMENT

(75) Inventors: Pekka Niemelä, Tornio (FI); Eero Väänänen, Tornio (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/362,475

(22) PCT Filed: Aug. 24, 2001

(86) PCT No.: PCT/FI01/00743

§ 371 (c)(1),
(2), (4) Date: Feb. 24, 2003

(87) PCT Pub. No.: WO02/16866

PCT Pub. Date: Feb. 28, 2002

(65) Prior Publication Data

US 2003/0178283 A1 Sep. 25, 2003

(30) Foreign Application Priority Data

Aug. 25, 2000 (FI) .............................................. 20001881

(51) Int. Cl.[7] .............................................. B65G 43/00
(52) U.S. Cl. .................................. 198/502.2; 198/502.2
(58) Field of Search .......................... 198/502.1, 502.2

(56) References Cited

U.S. PATENT DOCUMENTS

| | | |
|---|---|---|
| 4,498,778 A | 2/1985 | White |
| 4,929,843 A | 5/1990 | Chmielewski, Jr. et al. |
| 4,979,815 A | 12/1990 | Tsikos |
| 5,519,793 A | 5/1996 | Grannes |

FOREIGN PATENT DOCUMENTS

| | | | |
|---|---|---|---|
| AU | 267236 | * | 5/1965 |
| DE | 37 35 749 A | * | 5/1988 |
| DE | 39 21 956 | | 12/1990 |
| DE | 42 40 094 A1 | * | 6/1994 |
| EP | 0 147 802 | | 7/1985 |
| SU | 1490056 | * | 6/1989 |

* cited by examiner

*Primary Examiner*—Richard Ridley
(74) *Attorney, Agent, or Firm*—Smith-Hill and Bedell

(57) ABSTRACT

The invention relates to a method for measuring the surface height of a material bed transported on a conveyor belt to continuously operated thermal treatment, i.e. to continuously operated sintering, when said material bed is formed of single spherical and fragile particles. According to the invention, the material bed (3) formed on the conveyor belt (4) is illuminated, essentially in the transversal direction of the conveyor belt (4), by at least one light source (5), so that the light beam (6) forms an essentially linear light streak (7) on the surface of the material bed (3), and that for registering said light streak (7), there is used at least one camera (8) and at least one image processing arrangement (9) connected to the camera (8), and that in the image processing arrangememt (9), the obtained surface height image is compared with a predetermined, desired surface height image in order to detect deviations in the surface height, and that said image processing arrangement (9) is connected to an automation unit (10) in order to correct the deviations in the surface height.

21 Claims, 1 Drawing Sheet

Figure 1:
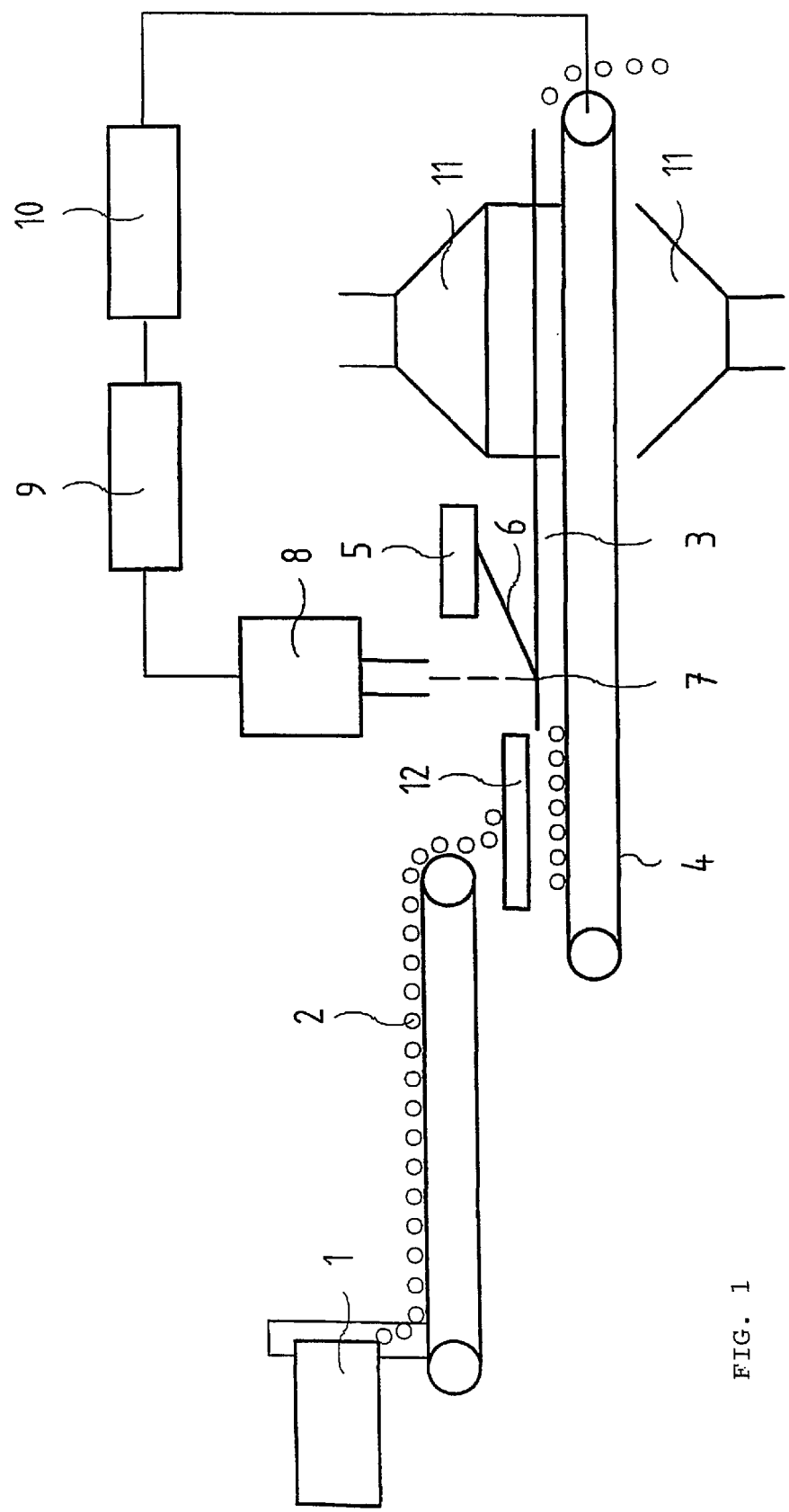

METHOD FOR MEASURING THE SURFACE HEIGHT OF A MATERIAL BED CONDUCTED ON A CONVEYOR BELT TO THERMAL TREATMENT

The present invention relates to a method for measuring the surface height of a material bed conducted on a conveyor belt to continuously operated thermal treatment, continuously operated sintering, essentially throughout the whole width of the conveyor belt.

In continuously operated sintering, there is nowadays generally used a conveyor-type sintering device, where on the conveyor belt, there is first formed a material bed. The material bed usually consists of spherical, fragile pellets, which by means of a high-temperature treatment, i.e. sintering, are hardened so that the pellets can be fed to further treatment, for instance to a smelting furnace. In the sintering of a material bed, through the material bed located on the conveyor belt, and simultaneously through the conveyor belt itself, there is first conducted hot gas, so that the temperature of the material bed rises, for instance in the case of ferroalloy pellets, up to the range of 1300–1600° C. At a high temperature, the fragile pellets react with the hot gas and are hardened in the process. Thereafter the hardened pellets obtained in the material bed are cooled by conducting cooling gas through the material bed and the conveyor belt. Thus the conveyor belt employed in continuously operated sintering is used under remarkable fluctuations of temperature.

In order to obtain an advantageous sintering product, the material bed must be essentially even throughout the whole width of the conveyor belt. For measuring the evenness of the material bed, there are used for instance wires that are spaced apart over the conveyor belt, said wires being at one end connected to a common bar installed in parallel to the conveyor belt, so that the wires move along the top surface of the material bed. Moreover, in the measuring device there are installed separate bars for the top surface of the material bed, said bars defining the allowed lower and upper limits of the material bed. If the position of the bar connected to the measuring wires falls outside the allowed position of the top and bottom limits, there is sent an emergency notice in order to be able to adjust the material bed to the desired level before the sintering process.

For measuring the surface height of material beds, there also are used optical measurement devices installed at the edge of the conveyor belt. In a similar way, as the wires described above, said optical measurement devices measure only the top surface of the material bed with respect to the proceeding direction of the conveyor belt. By means of this equipment, it is not, however, possible to detect for instance potholes or apertures made in the material bed, i.e. spots where the amount of material to be sintered is slight or nonexistent. Such potholes or apertures may cause even large damages to the conveyor belt, because normally the conveyor belt as such is resistant to a temperature of about 500° C. only, whereas in the material bed sintering zone, the temperature in the top part of the material bed may rise up to 1300° C. and over.

The object of the present invention is to eliminate some of the drawbacks of the prior art and to realize an improved method for measuring the surface height of a material bed going to a continuously operated thermal treatment, i.e. to continuously operated sintering, so that the height of the material bed can be measured essentially along the whole width of the conveyor belt. The essential novel features of the invention are apparent from the appended claims.

According to the invention, in order to measure the surface height of the material bed in a continuously operated thermal treatment of said material bed, i.e. in continuously operated sintering, above the conveyor belt used for transporting the material bed through the various thermal treatment steps, essentially immediately after feeding the material bed onto the conveyor belt in the proceeding direction of said conveyor belt, there is installed at least one light source emitting an essentially narrow, linear light beam, which is used for illuminating the material bed composed of single spherical and fragile particles essentially along the whole width of the material bed. Now the beam of light forms on the material bed surface a line representing the height of the material bed; In order to detect the line cast by the light source, essentially above the line formation spot, there is installed at least one camera, by means of which the line representing the material bed surface is transmitted to at least one image processing arrangement. The image of the material bed, obtained by the image processing arrangement, is compared with a desired, predetermined and essentially advantageous surface height image of the material bed. The image processing arrangement is further connected to an arrangement whereby it is possible, when necessary, to adjust for instance the speed of the conveyor belt in order to adjust the surface height of the material bed to a desired value.

In a preferred embodiment of the invention, the employed light source is a laser light source that is installed above the conveyor belt transporting the material bed, so that the beam of light emitted from the light source meets the material bed surface at a sharp angle. With respect to the conveyor belt, the light source is installed so that the light source meets the material bed essentially near to the spot where the material bed is fed onto the conveyor belt. The angle between the light beam and the surface of the material bed is within the range 0–45 degrees, advantageously 30–40 degrees. However, the light source can also be installed, in relation to the material bed surface, so that the light beam coming from the light source forms, with respect to the proceeding direction of the conveyor belt, an essentially right angle, in which case the light beam meets the material bed essentially perpendicularly.

In order to detect the line formed by the light beam on the surface of the material bed, there is advantageously installed a camera above the line formation spot, and the image created by said camera is transmitted to an image processing arrangement. In the image processing arrangement, the image is divided into sections, essentially so that a given section of the image corresponds to a given part of the line created on the surface of the material bed in the transversal direction of the conveyor belt. The obtained image is then processed so that each section is represented by a respective column on the display screen. In height, each column corresponds to the height of the material bed located on the conveyor belt. The obtained image is compared with an image created by a the predetermined, desired surface height. In case the image obtained of the material bed deviates in some respects from the desired image of the material bed, an emergency notice is given, and on the basis of said notice, the material bed is adjusted to be suitable, for instance by adjusting the speed of the conveyor belt prior to feeding the material bed to the various steps of the thermal treatment. The adjustment of the conveyor belt speed functions as an adjustment of the material bed height; for example when the need arises to raise the material bed height, the speed of the conveyor belt is slowed down, so that at an even feed rate, more material at a time is fed onto the conveyor belt.

When applying the method according to the invention for measuring the surface height of a material bed that is subjected to thermal treatment, the measurement as such can be carried out without mechanically touching the material bed itself. This is particularly advantageous, because normally the material bed is formed of fragile, moist pellets, which are easily broken by mechanical contact. Moreover, when operating according to the method of the invention, the measuring device is free of any mechanically wearing parts. Further, when the method according to the invention is applied, in the measuring of the surface heights of material beds, there are not needed any such measuring devices that could present an obstacle for a smoothing out of the material bed prior to the thermal treatment thereof.

The invention is explained in more detail below, with respect to the appended drawing that shows a preferred embodiment of the invention, seen in a schematical sideview illustration.

According to the drawing, the fragile and moist pellets 2 obtained from pelletizing 1 are conducted, by means of a feed conveyor 12 employed as the feed device, to form a material bed 3 onto the belt 4 of the conveyor, which belt then transports the pellets through the sintering steps 11. Above the plane formed by the material bed 3, essentially near to the spot where the material bed 3 is formed, there is installed a laser light source 5, and the light beams 6 emitted from said light source are directed, with respect to the material bed 3, so that the light beams 6 form an angle of about 30 degrees with respect to the material bed 3. The laser light beams 6 form on the surface of the material bed 3 an essentially linear laser streak 7. In order to detect the laser streak 7, there is installed, above the conveyor belt 4, essentially at the same spot as the created laser streak 7, a camera 8 that creates an image of the laser streak 7 located on the surface of the material bed 3, and said image is electrically transmitted to the image processing arrangement 9 connected to the camera 8. In the image processing arrangement 9, the received image is divided into sections in the transversal direction of the conveyor belt 4, and said sections are illustrated for instance on a display screen as a bar diagram. In the bar diagram, the bar corresponding to each section describes the surface height of the material bed 3 at the respective spot in the transversal direction of the conveyor belt 4. In addition, the image processing arrangement 9 compares the newly created image with the image of a predetermined, desired surface height. If the newly created image essentially deviates from the desired height, at least in the most critical spots, the image processing arrangement 9 also gives a sound alarm. In order to correct possible deviations, the image processing arrangement 9 is further connected to an automation unit 10, which adjusts the speed of the conveyor belt 4 when necessary in order to correct the deviations. When necessary, deviations can also be corrected manually.

What is claimed is:

1. A method of controlling the surface height of a material bed transported on a moving conveyor belt for continuous thermal treatment, comprising the following steps:
    illuminating a region of the material bed with a light beam that forms a line extending transversely of the conveyor belt,
    acquiring an image of said region of the material bed,
    comparing the image acquired in the preceding step with an image of said region of the material bed when the bed has a predetermined desired surface height, and
    adjusting the height of the material bed in dependence on the comparison.

2. A method according to claim 1, wherein the light beam is incident on the material bed at an acute angle.

3. A method according to claim 2, wherein the light beam is incident on the material bed at an angle up to 45°.

4. A method according to claim 3, wherein the light beam is incident on the material bed at an angle in the range 30–40°.

5. A method according to claim 1, wherein the light beam is a laser light beam.

6. A method according to claim 1, comprising acquiring said image from a viewing location that substantially coincides with the location of the line with respect to the movement of the conveyor belt.

7. A method according to claim 1, comprising adjusting the height of the material bed by adjusting the speed of movement of the conveyor belt.

8. A method of controlling the surface height of a material bed transported on a moving conveyor belt for continuous thermal treatment, comprising the following steps:
    illuminating a region of the material bed with a light beam that forms a line extending transversely of the conveyor belt,
    acquiring a first image of said region of the material bed when the bed has a predetermined desired surface height,
    subsequently acquiring a second image of said region of the material bed,
    comparing the second image with the first image, and
    adjusting the height of the material bed in dependence on the comparison.

9. A method according to claim 8, wherein the light beam is incident on the material bed at an acute angle.

10. A method according to claim 9, wherein the light beam is incident on the material bed at an angle up to 45°.

11. A method according to claim 10, wherein the light beam is incident on the material bed at an angle in the range 30–40°.

12. A method according to claim 8, wherein the light beam is a laser light beam.

13. A method according to claim 8, comprising acquiring said images from a viewing location that substantially coincides with the location of the line with respect to the movement of the conveyor belt.

14. A method according to claim 8, comprising adjusting the height of the material bed by adjusting the speed of movement of the conveyor belt.

15. An improved method of continuously forming sintered pellets, comprising;
    forming discrete pellets of unsintered material,
    depositing the unsintered pellets as a material bed on an endless belt,
    driving the endless belt such that the material bed passes through a furnace whereby the particles are sintered, and
    discharging the sintered pellets from the belt,
    wherein the improvement comprises controlling the height of the material bed of unsintered pellets on the endless belt by:
        illuminating a region of the material bed with a light beam that forms a line extending transversely of the conveyor belt, acquiring a first image of said region of the material bed when the bed has a predetermined desired surface height, subsequently acquiring a second image of said region of the material bed, comparing the second image with the first image, and adjusting the height of the material bed of unsintered pellets in dependence on the comparison.

16. A method according to claim 15, wherein the light beam is incident on the material bed at an acute angle.

17. A method according to claim 16, wherein the light beam is incident on the material bed at an angle up to 45°.

18. A method according to claim 17, wherein the light beam is incident on the material bed at an angle in the range 30–40°.

19. A method according to claim 15, wherein the light beam is a laser light beam.

20. A method according to claim 15, comprising acquiring said images from a viewing location that substantially coincides with the location of the line with respect to the movement of the conveyor belt.

21. A method according to claim 15, comprising adjusting the height of the material bed by adjusting the speed of movement of the conveyor belt.

* * * * *